United States Patent [19]

Bauernfeind et al.

[11] Patent Number: 4,660,313
[45] Date of Patent: Apr. 28, 1987

[54] DUCK DECOY DEPLOYER

[76] Inventors: Robert A. Bauernfeind, 1416 Oak Haven Rd., Jacksonville, Fla. 32207; C. Braley Carroll, 1840 Shelton Rd., Jacksonville, Fla. 32211

[21] Appl. No.: 898,628

[22] Filed: Aug. 21, 1986

[51] Int. Cl.⁴ .............................................. A01M 31/06
[52] U.S. Cl. ............................................................ 43/3
[58] Field of Search .................. 43/2, 3; 135/26, 107, 135/109; 446/227, 268, 153

[56] References Cited

U.S. PATENT DOCUMENTS

| | | | |
|---|---|---|---|
| 710,433 | 10/1902 | Coudan | 43/3 |
| 796,147 | 9/1905 | Reynolds | 43/3 |
| 1,376,282 | 4/1921 | Kauffman | 43/3 |
| 1,746,640 | 2/1930 | Emoff | 43/3 |
| 2,547,286 | 4/1951 | Sabin | 43/3 |
| 2,616,200 | 11/1952 | Milan | 43/3 |
| 2,624,144 | 1/1953 | Beverman | 43/3 |

Primary Examiner—Nicholas P. Godici
Assistant Examiner—Karen Skillman
Attorney, Agent, or Firm—Arthur G. Yeager

[57] ABSTRACT

A collapsible wire framework to which duck decoys are attachable comprising a central plate with a plurality of spaced connector rods pivotally attached thereto so as to spread radially at equal angles from the central plate, a plurality of slidable spreader bars attached to adjacent connector rods to hold the connector rods in a spread position or to allow all connector rods to collapse to a parallel bunched position, swivel fasteners for attaching a duck decoy to the end of each connector rod and to the central plate, and an attachment location for a length of twine and an anchor weight suspended from the central plate.

6 Claims, 8 Drawing Figures

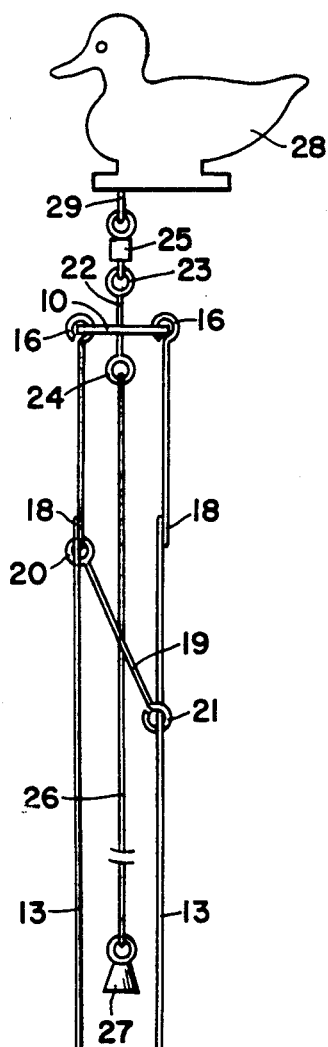
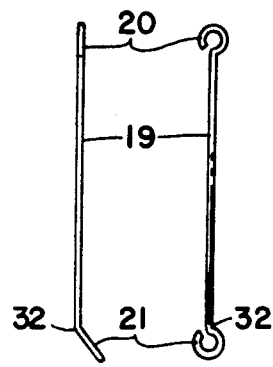
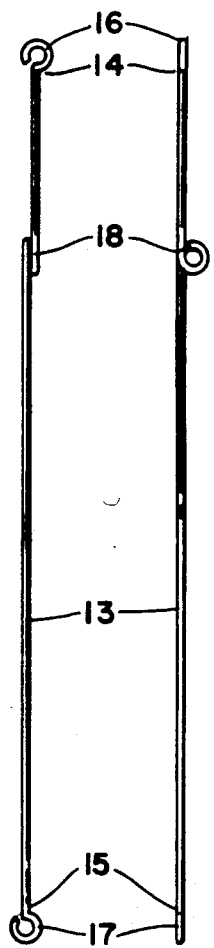
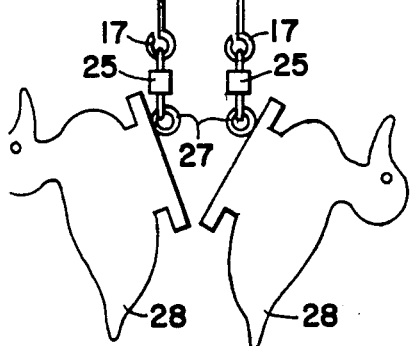
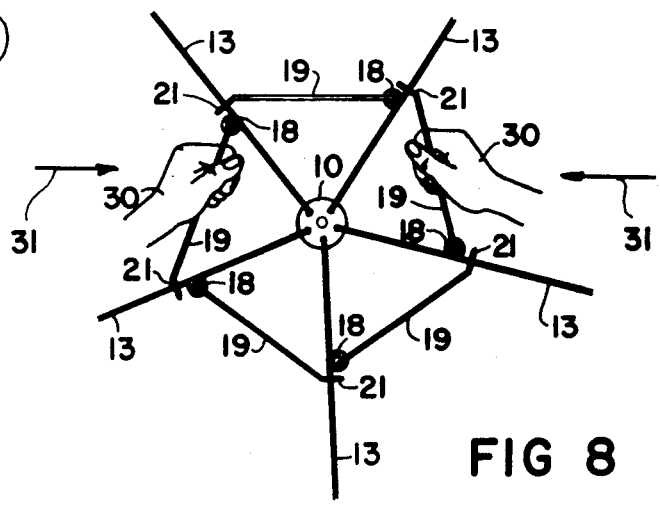
FIG 3  FIG 4  FIG 5  FIG 6  FIG 7  FIG 8

DUCK DECOY DEPLOYER

BACKGROUND OF THE INVENTION

The use of floating decoys by duck hunters is an age old practice. Decoys were carved from wood and painted to represent a swimming duck. In general one or two dozen decoys would be spread around the duck blind area, each decoy having its own anchor to hold it in place. With the advent of plastic molding, decoys were made of hollow plastic materials which were much lighter in weight than the previous wooden decoys. It then became apparent that several decoys could be connected to each other and not have to be handled separately. In U.S. Pat. No. 2,616,200 W. A. Milam described a Decoy Spreader involving five decoys held in a framework which can be collapsed for transportation to and from the duck hunting area and can be spread out in a diamond formation on the water. The five decoys are handled as a unit. The difficulty with this device however, is that in deploying the unit by throwing it into the water the individual decoys do not always spread out as desired, but sometimes pivot the wrong way causing one or more decoys to be upside down.

It is an object of this invention to provide a novel unit of duck decoys. It another object of this invention to provide a duck decoy deployer that does not become entangled or improperly positioned when used. Other objects will become apparent from the more detailed description which follows:

BRIEF SUMMARY OF THE INVENTION

This invention relates to a duck decoy deployer comprising a central plate, a plurality of elongated radially spaced stiff connecting rods pivotally attached at one end to said central plate and adapted to extend radially outward to a free end where a swivel fastener is attached to said rod, a stiff spreader bar pivotally attached to each said rod adjacent said one end and slidably attached to one adjacent said connecting rod, a short central connector means affixed to the center of said plate and extending outwardly from both sides of said plate to a free end above said plate and a free end below said plate, fastening means for attaching a duck decoy to the free end above said plate and means to suspend an anchor weight from the free end below said plate.

In specific embodiments of this invention the deployer has five connector rods extending outward from the central plate and five spreader bars which collapse when in the carrying arrangement to a bundle of parallel rods connected to the central plate, but when two of the spreader bars, substantially opposite each other are grasped and pushed toward each other the five connector bars spread out in a star formation with a decoy at the end of each rod and a sixth decoy attached to the central plate.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a side elevational view of the duck decoy deployer of this invention in the collapsed formation;

FIG. 4 is a side elevational view of the spreader bar of this invention;

FIG. 5 is a front elevational view of the spreader bar of this invention;

FIG. 6 is a front elevational view of the connector rod of this invention;

FIG. 7 is a side elevational view of the connector rod of this invention; and

FIG. 8 is a schematic illustration of how the deployer of this invention is handled to cause it to spread out.

DETAILED DESCRIPTION OF THE INVENTION

The structure and operation of the invention may best be understood by reference to the attached drawings.

Figure 1:
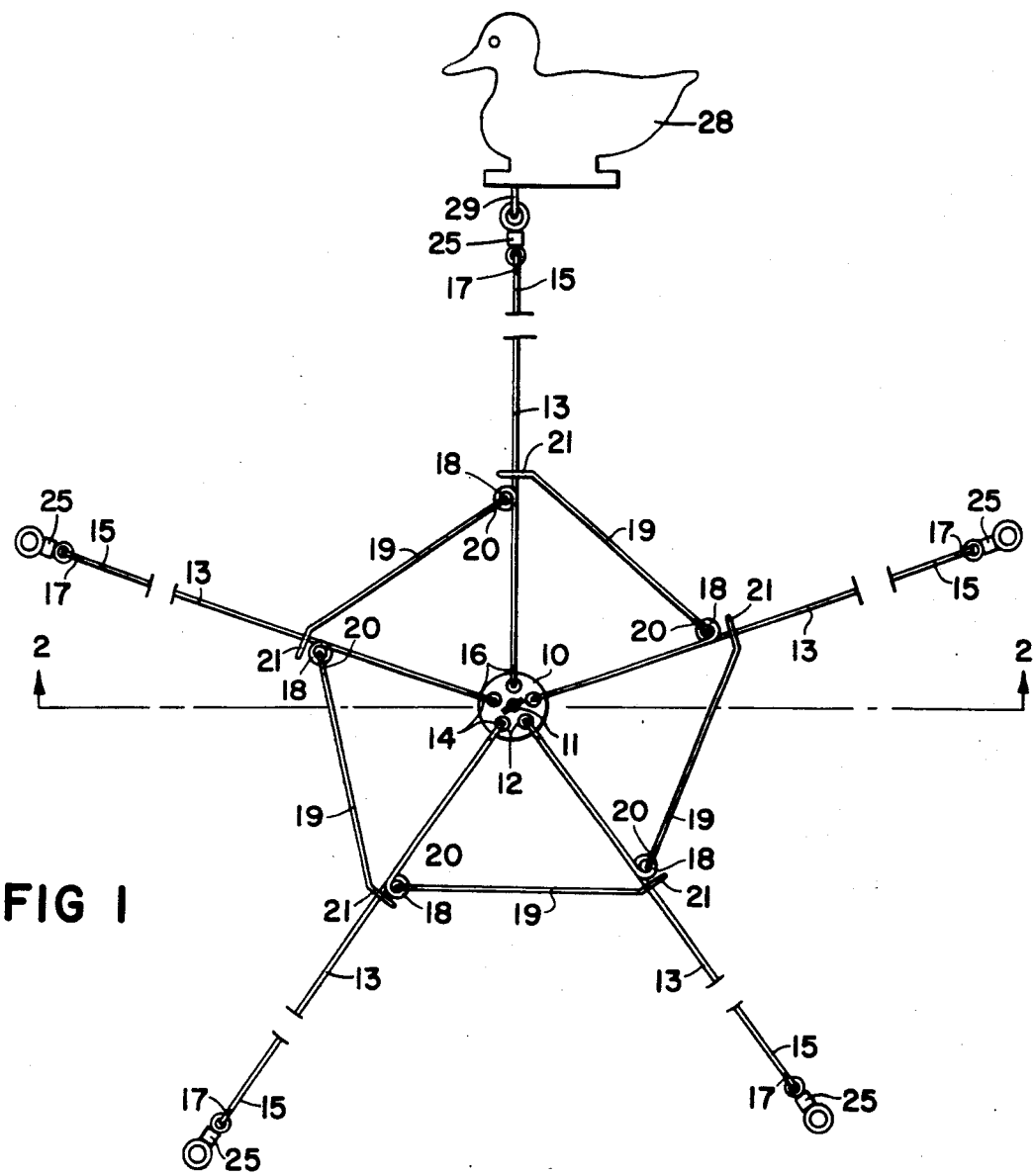
FIG. 1 is a top plan view of the duck decoy deployer of this invention in the spread formation.
Figure 2:
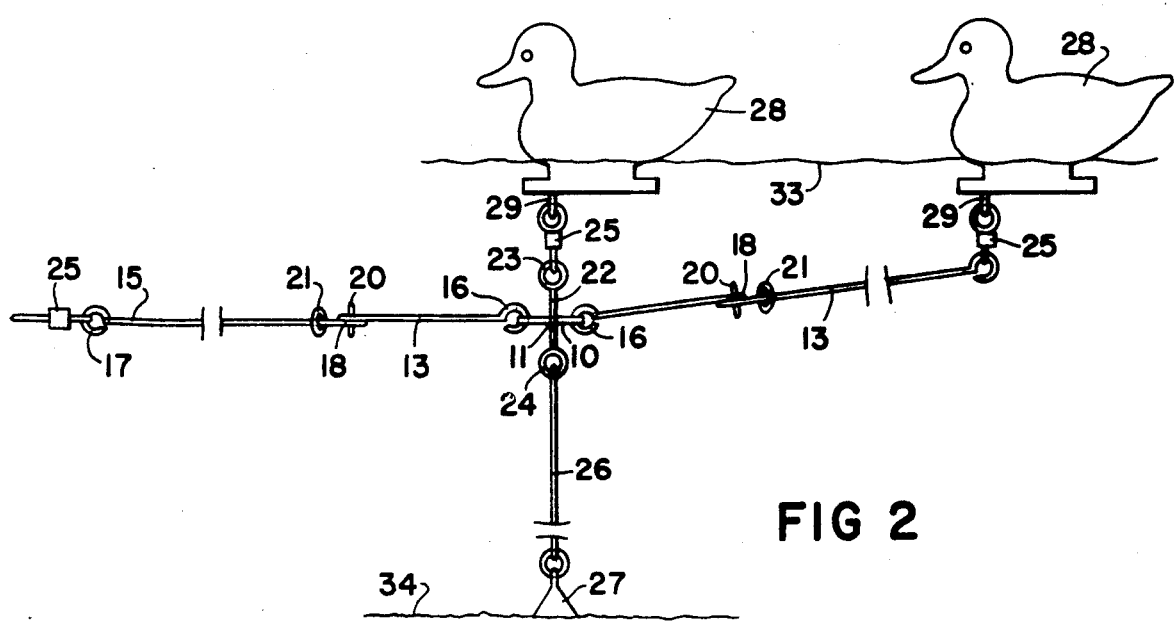
FIG. 2 is a cross sectional view taken at 2—2 of FIG. 1.

A central plate 10 holds the entire structure together whether it be in a spread arrangement as in FIGS. 1 and 2 or a collapsed arrangement as in FIG. 3. Plate 10 is punctured with a central hole 11 and a plurality of spaced peripheral holes 12. The number of peripheral holes 12 corresponds to the number of peripheral decoys which a hunter wishes to deploy. The number should be at least three and not more than about eight. Three are needed for the mechanism of this deployer to work easily. More than about eight decoys is too cumbersome to handle The most desired number is 5 or 6, the drawings illustrating six. Whatever the chosen number of peripheral holes 12, they are equally spaced about the periphery of plate 10.

An elongated connector rod 13 is pivotally fastened to each hole 12 by means of an eye 16. Connector rod 13 has an inner end 14 near plate 10 and an outer free end 15 with eye 16 at inner end 14 and eye 17 at outer end 15. It may be seen that rods 13 can pivot in all directions around the connection between eye 16 and hole 12. At outer free end 15 eye 17 is connected to any desired type of swivel fastener 25 which in turn is releasably fastened to an eye 29 in the bottom of duck decoy 28. For the sake of simplicity only one decoy 28 is shown in FIG. 1 and two decoys in FIG. 2. It is to be understood, however, that the structure shown in FIG. 1 is designed to connect six decoys together, one at the end of each connector rod 13 and one to an attachment at center hole 11 of plate 10.

A short connector rod 22 extends slidably and rotationally through central hole 11 of plate 10. Rod 22 terminates in an upper end 23 above plate 10 and a lower eye 24 below plate 10. Upper eye 23 has a swivel fastener 25 attached thereto for connection to eye 29 on decoy 28 as shown in FIG. 2. Lower eye 24 is attached to the upper end of a connection means 26 which has an anchor weight 27 attached to the other end thereof so that weight 27 may drag on the bottom 34 of the body of water in which the decoys are deployed. Connection means 26 preferably is twine or filament which can be tied to eye 24 in whatever length that may be needed.

Connector rods 13 are connected to each other by a plurality of spreader bars 19 equal in number to the number of connector rods 13. Each connector rod 13 has a third eye 18 between inner eye 14 and outer eye 15, preferably located about $\frac{1}{4}$ to $\frac{1}{3}$ of the length of connector rod 13 measured from inner eye 14. Thus eye 18 is closer to inner eye 14 than to outer eye 15. Third eye 18 serves as an attachment for one end of spreader bar 19 which is terminated at each end by an eye 20 or 21. In these drawings eye 20 of spreader bar 19 is pivotally attached to eye 18 of connector rod 13. At the opposite end of spreader bar 19 eye 21 slidably encircles connector rod 13 between third eye 18 and outer eye 15. The attachment of spreader bars 19 to connector rods 13 is such that each connector rod 13 has one spreader bar 19 attached through its eye 20 to third eye 18 and has the spreader bar of an adjacent connector rod 13 attached through slidable eye 21 to its portion between third eye 18 and outer eye 15. Spreader bars 19 are thusly attached in a repeating order so that spreader bars 19 are connected to all connector rods 13. Because eye 21 of each spreader bar 19 slides on a connector rod 13 it is preferable for eye 21 to be bent at an angle at 32 (see FIG. 4) so that eye 21 is approximately perpendicular to connector rod 13 which passes through eye 21. This provides a maximum of freedom for eye 21 and rod 13 to slide with respect to each other.

In FIG. 2 it is seen that when in use the deployer of this invention will be suspended below water line 33 upon which decoys 28 are floating.

In FIG. 3 the deployer of this invention is shown in a collapsed arrangement. For the sake of simplicity only three of the six decoys are shown and several of connector rods 13 and spreader bars 19 are also omitted. This collapsed arrangement is convenient for carrying the deployer by hand or transporting it in a vehicle. By grasping the decoy 28 attached to short connector rod 22 (the central decoy in the deployed spread arrangement on the water) and lifting it upwards the connector rod 13 and spreader bars 19 automatically hang downward as shown. Eye 21 of spreader bar 19 slides downward toward outer eye 17 and connector rods hang vertically downward. Anchor weight 27 and its connector means 26 also hang downward.

In order to use the deployer it is manipulated as shown in FIG. 8 from the collapsed arrangement of FIG. 3 to the spread arrangement of FIG. 1. The user grasps two spreader bars 19 by his hands 30 as shown in FIG. 8 and pushed spreader bars 19 toward each other in the direction of arrows 31 so as to move the respective eyes 21 toward the cooperating third eyes 18. Opposite spreader bars 19, or as close to opposite as possible, should be grasped for this operation to make it easier to manipulate. The entire structure will spread somewhat similar to the opening of an umbrella. When the structure is fully spread open it is merely tossed or dropped onto the surface of the water where the buoyancy of the decoys will tend to maintain the spread position until the central decoy is lifted out of the water to cause the structure to assume the collapsed arrangement. Preferably spreader bars are held in a generally vertical plane, with the uppermost spreader bar 19 in the plane being free and the hands grasping the next spreader bars 19 on either side of the free one. The remaining spreader bars 19 will hang vertically below the hands. As hands 31 are moved in the direction of arrows 31 the upper three spreader bars 19 will assume the spread formation of FIG. 1 and the remaining spreader bars will be at least partially spread. As soon as the entire framework is thrown onto the water, all spreader bars 19 will assume the spread formation of FIG. 1.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A duck decoy deployer comprising a central plate, a plurality of enlongated radially spaced stiff connecting rods pivotally attached at one end to said central plate and adapted to extend radially outward to a free end where a swivel fastener is attached to said rod, a stiff spreader bar pivotally attached to each said rod adjacent said one end and slidably attached to an adjacent said connecting rod, a short central connector means affixed to the center of said plate and extending outwardly from both sides of said plate to a free end above said plate and a free end below said plate, fastening means for attaching a duck decoy to the free end above said plate, and means to suspend an anchor weight from the free end below said plate.

2. The deployer of claim 1 which includes five said connector rods and five said spreader bars.

3. The deployer of claim 1 wherein said spreader bar is an elongated rod with an eye at each end thereof, the portion including one eye being bent at an angle from the remainder of said rod.

4. The deployer of claim 1 wherein said central connector means is a short rod extending through said plate and having an eye on each end thereof.

5. A duck decoy deployer to which six duck decoys are removeably attachable, comprising a central plate with five equally spaced holes through the plate and positioned around the periphery thereof and one hole through the center of the plate, five elongated stiff wire connecting rods having an inner end and an outer end with an eye at each said end and a third eye located about $\frac{1}{4}$ to $\frac{1}{3}$ of the distance between the end eyes and closer to said inner end, each said rod being pivotally attached respectively to one of said equally spaced holes in the central plate by the inner end eye, five stiff wire spreader bars having an eye at each end thereof and attached respectively to pairs of adjacent said connecting rods with one eye of said bar being pivotally attached to said third eye of one connecting rod and the other eye of said bar slidably encircling the next adjacent connecting rod between said third eye and the outer end eye; a swivel fastener attached to each said outer end eye; a single short connecting rod extending through the central hole of said plate with an eye on each end of said rod, a swivel fastener attached to one eye of said short connecting rod and a linking means having one end attached to the other eye of said short connecting rod and having an anchor weight on the other end.

6. The deployer of claim 5 wherein said linking means is a flexible filament.

* * * * *